Patented May 25, 1954

2,679,476

UNITED STATES PATENT OFFICE 2,679,476

PROCESS OF MAKING RHODINOL

Stephen P. Joffre, Little Falls, N. J., assignor to Shulton, Inc., Clifton, N. J., a corporation of New Jersey No Drawing. Application June 20, 1952,
Serial No. 294,720

7 Claims. (Cl. 204—158)

The present invention relates to a process for the isomerization of higher unsaturated alcohols, and, more particularly, to the isomerization of citronellol to rhodinol.

Citronellol and its isomer rhodinol are used extensively in the perfume industry. The opinion of the expert perfumers is that rhodinol is the more valuable substance because it is characterized by a deeper, longer-lasting rose note, as contrasted to the cheaper citronellol which is much lighter in odor characteristics and has a readily identifiable odor quality which reveals its origin from citronella oil. Consequently, considerable effort has been made to convert the cheaper citronellol to the more valuable rhodinol.

Citronellol is thought to contain more of a substance in its alpha or limonene form, identified by the Geneva system of chemical nomenclature as 2,6-dimethyl-1-octen-8-ol; whereas rhodinol is supposed to possibly be equal parts of limonene and terpinolene identified as 2,6-dimethyl-2-octen-8-ol, the beta form of this substance. While the Geneva nomenclature used is based on the best scientific evidence available at present, it still may not correctly describe these substances. In any case, citronellol and rhodinol are actually mixtures of these substances.

Heretofore, rhodinol has been produced by reacting citronellol with acetic anhydride to form citronellol acetate; halogenating the citronellol acetate with bromine; dehalogenating; and saponifying with caustic whereby to form the isomer of citronellol, to wit, rhodinol, and alkali acetate. Thereafter, the alkali is washed out with water; the water is separated from the water insoluble rhodinol; and the rhodinol is rectified for example, by vacuum distillation or in a fractionating column to isolate the rhodinol from terpenes, color bodies and other impurities and eventually recovering the rhodinol in a state usable in perfuming. This process only produces fair yields of rhodinol. Since this process requires the use of acetic, anhydride, bromine and caustic which add to the cost of the process and which call for careful handling to prevent health hazards because of their relatively strong chemical activity, it has not been used extensively commercially.

Rhodinol can also be obtained by the fractionation of Reunion Geranium Oil (Geranium Bourbon), but at considerable expense; and is also known to be present in smaller amounts in other essential oils, such as *Pelargonium roseum* Willd, Bulgarian rose oil, and others. The perfume industry, in general, uses the expensive product obtained from Geranium Bourbon or uses cheap substitutes, usually blends or mixtures of several materials, which cost only about one third or about one quarter of the more expensive material. The actual yields, considering the nature of the former process are good, but the process is lengthy, somewhat difficult to carry out, and produces rhodinol of only a fair quality.

The perfume industry for many years has recognized the need of processes which are improvements over heretofore known processes for producing rhodinol.

Accordingly, an object of the present invention is to provide a process for making rhodinol which eliminates the foregoing difficulties and disadvantages.

Another object is to provide a process for the isomerization of citronellol to rhodinol which is simple, practical and economical.

Another object is to provide such a process which eliminates the necessity of chemicals to carry out the reaction.

A further object is to provide such a process which makes possible higher yields of rhodinol from citronellol.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, it has been found that citronellol can be isomerized to rhodinol by exposing liquid citronellol either at room temperature or at elevated temperatures, up to its boiling point, to strong ultraviolet light for a sufficient duration so that by simple rectification a high yield of the more valuable rhodinol is obtained. Such a process may be practiced with or without the admixture of a metallic catalyst in the citronellol, and, preferably, is carried out while excluding contact of the citronellol with the oxygen contained in air.

The citronellol utilized in practicing this process may be of either natural or synthetic origin. For example, citronellol is found in nature in rose oil, oil of citronella and in geranium oil, but most commonly is derived from citronella or geranium oil because of its comparative cheapness and general availability. The generally accepted boiling point temperature of citronellol is about 223–5° C. at one atmosphere.

The source of ultraviolet light may be any one of a number of commercially available lamps capable of emitting a fairly high concentration of ultraviolet rays, must be considerable to effect the desired conversion.

The time of exposure of the citronellol to ultraviolet light and the temperature at which the same is so exposed to effect isomerization thereof to rhodinol may be varied over wide limits. The best conditions of time and temperature are a function of the nature of the ultraviolet source relied upon, that is, the spectral intensity and output thereof. For example, where ultraviolet light of a high intensity is utilized, the process may be carried out in a shorter period of time and/or at a lower temperature. Likewise, for a given intensity of ultraviolet light, the process may be carried out more rapidly at a higher temperature. The process therefore can be accomplished with or without added heat without departing from the basic nature and scope of the present invention.

The metallic catalysts which may be utilized may be of one or several of the group consisting of mercuric oxide, vanadium pentoxide, etc. Such catalysts are commonly known as promoters. In employing such catalysts in conjunction with the basic process, it has been found that they do not greatly influence the yield of rhodinol or the time required to obtain a predetermined yield. Their use therefore is optional. However, where these catalysts are admixed with the citronellol, it has been found beneficial to carry out the process by excluding the contact of oxygen, such as in air, with the citronellol to eliminate any tendency to cause oxidation of the citronellol or the rhodinol derived therefrom.

The process may be carried out by utilizing various forms of apparatus which are sufficiently well known as not to require illustration thereof. For example, the citronellol may be placed in a glass-lined tank and agitated while exposing the same to an ultraviolet light source within or above the tank. The tank may be either open at the top or closed completely to exclude air. Likewise, the citronellol could be placed in a container formed of quartz glass or other material through which ultraviolet light will pass while applying the ultraviolet light from the exterior of the container. Alternatively, the citronellol could be circulated through a quartz glass tube or the like through which ultraviolet light is directed. External heat may be supplied to citronellol in any suitable manner directly or indirectly, for example, electrically or by heat exchangers utilizing either hot air or steam or by an open flame applied to the tank or other receptacle containing the material to be processed. Obviously, such heating means may be controlled manually and/or automatically to maintain the desired temperature.

In order to illustrate practical applications of a batch process in accordance with the present invention, apparatus was set up comprising a one liter wide mouth glass flask; a stopper for the flask provided with an opening, a small and a large aperture and a bushing; a thermometer extending through the small aperture with its bulb in the lower region of the flask; a reflux condenser in the vent, an agitator rotatably mounted in the bushing and extending into the flask; a motor for driving the agitator; and electrically heated, rheostat controlled heating mantle supporting the flask; a stand having a clamp for holding the flask steady; and an ultraviolet lamp sealed in a quartz cell extending through the large aperture to the lower region of the flask. The lamp used was rated at 90 to 110 volts and 100 watts when in operation.

*Example I*

In carrying out the process with this apparatus, three runs were made with 645 grams of citronellol refluxed in the flask for 12 hours. On cooling, this material was transferred to an efficient distillation apparatus and was fractionated. In this manner, on an average, 463 grams of a good grade rhodinol was obtained, boiling at 70° to 75° C. at one millimeter of mercury, representing a yield of 72% based on the citronellol. This demonstrates that the present process is highly effective in isomerizing citronellol to rhodinol without a series of chemical synthesis, and that the yield compares favorably with yields of about 60 to 65% which can be obtained by chemical synthesis.

*Example II*

Using the same apparatus, three runs were made with 614 grams of citronellol refluxed in the flask for 24 hours. Upon fractionation, on an average of 473 grams of an excellent grade of rhodinol was obtained, boiling at 87° C. at 1.5 millimeters of mercury, representing a yield of 77%.

*Example III*

Again using the same apparatus, 500 grams of citronellol containing 0.5 grams of yellow mercuric oxide were heated at 165° C. for 12 hours. On cooling, the material was fractionated in the distillation apparatus, and 324 grams of a good grade rhodinol was obtained, representing a yield of 65%.

*Example IV*

In order to illustrate practical applications of a continuous process in accordance with the present invention, apparatus was set up including the lamp cell, and 1.5 a quartz cell containing liters of citronellol at its reflux temperature under atmospheric pressure was passed through this cell at a rate of about 5 cc. per minute. This process was repeated two times. On cooling and after standing several days, the material so treated was transferred to the distillation apparatus and fractionated. In this manner, 558 grams of material with a rhodinol character was obtained boiling at 81° to 82° C. at one millimeter of mercury, representing a yield of 47%.

*Example V*

Again using the apparatus in accordance with that described in connection with Example IV, one liter of citronellol was passed through the cell at a rate of about 5 cc. per minute while at its reflux temperature under atmospheric pressure. On cooling, and after standing for several days, this material was fractionated. In this manner 270 grams of a material with a rhodinol character was obtained, boiling at 76° C. at one millimeter of mercury, representing a yield of 34%.

While on a laboratory scale, the yields obtained by use of the continuous process were not as good as those obtained by the batch process, it is evident that the process can be carried out in several ways. It is also obvious that the continuous process can be made more efficient by utilizing an ultraviolet lamp of greater intensity or by passing the material through a series or battery of cells containing a lamp cell to make the time of exposure of the citronellol to the light equivalent to that attained in the batch process. The process in accordance with the invention is therefore not restricted to the manner in which the ultraviolet light is applied.

From the foregoing description, it will be seen that the present invention provides a simple, practical and economical process for producing a high grade rhodinol at yields greater than those obtained by heretofore known processes.

It will be understood that the details and examples hereinbefore set forth are illustrative only and that the invention as broadly described and claimed is in no way limited thereby.

What I claim is:

1. A process for the isomerization of citronellol to rhodinol which comprises exposing liquid citronellol of at least room temperature to ultraviolet light and rectifying the product to recover the rhodinol.

2. The process according to claim 1, wherein the citronellol is heated.

3. The process according to claim 1, wherein a metallic catalyst is admixed in the citronellol.

4. A process for the isomerization of citronellol to rhodinol comprising exposing liquid citronellol of at least room temperature to ultraviolet light until the product consists predominantly of rhodinol, and rectifying the product to recover the rhodinol.

5. The process according to claim 4, wherein a metallic catalyst is admixed in the citronellol and the product is filtered prior to rectification to recover the catalyst.

6. A process for the isomerization of citronellol to rhodinol comprising heating liquid citronellol to above room temperature while excluding contact thereof with oxygen, exposing the heated liquid citronellol to ultraviolet light until the product consists predominantly of rhodinol, and rectifying the product to recover the rhodinol.

7. The process according to claim 6, wherein a metallic catalyst is admixed in the citronellol.

References Cited in the file of this patent

UNITED STATES PATENTS

| Number | Name | Date |
| --- | --- | --- |
| 2,435,078 | Hearne et al. | Jan. 27, 1948 |
| 2,453,110 | Bain et al. | Nov. 9, 1948 |

OTHER REFERENCES

Scagliarini et al.: Chemical Abstracts, vol. 17 (1923), p. 2281.